United States Patent
Fitzpatrick et al.

(10) Patent No.: US 7,426,472 B2
(45) Date of Patent: Sep. 16, 2008

(54) METHOD AND SYSTEM FOR CONNECTING BUSINESSES THROUGH COMMON INTERESTS

(75) Inventors: Gregory P. Fitzpatrick, Keller, TX (US); Frederick Yung-Fung Wu, Greenwich, CT (US)

(73) Assignee: International Business Machines Corporation, Armonk, NY (US)

(*) Notice: Subject to any disclaimer, the term of this patent is extended or adjusted under 35 U.S.C. 154(b) by 736 days.

(21) Appl. No.: 10/081,702

(22) Filed: Feb. 22, 2002

(65) Prior Publication Data

US 2003/0163340 A1     Aug. 28, 2003

(51) Int. Cl.
*G06Q 30/00*      (2006.01)

(52) U.S. Cl. ............................................. 705/1; 705/8

(58) Field of Classification Search ................ 705/1, 705/78; 707/104.1
See application file for complete search history.

(56) References Cited

U.S. PATENT DOCUMENTS

| | | | | |
|---|---|---|---|---|
| 5,659,731 A * | 8/1997 | Gustafson | ...................... | 707/4 |
| 5,717,925 A * | 2/1998 | Harper et al. | ................ | 707/102 |
| 5,850,433 A * | 12/1998 | Rondeau | ................ | 379/218.01 |
| 5,918,222 A | 6/1999 | Fukui et al. | ...................... | 707/1 |
| 5,974,406 A | 10/1999 | Bisdikian et al. | ................ | 707/1 |
| 6,061,506 A | 5/2000 | Wollaston et al. | ........... | 395/500 |
| 6,073,138 A | 6/2000 | de l'Etraz et al. | ........... | 707/104 |
| 6,112,181 A | 8/2000 | Shear et al. | ...................... | 705/1 |
| 6,125,391 A * | 9/2000 | Meltzer et al. | .............. | 709/223 |
| 6,133,914 A | 10/2000 | Rogers et al. | ................ | 345/334 |
| 6,169,743 B1 | 1/2001 | Deare | .......................... | 370/425 |
| 6,205,472 B1 * | 3/2001 | Gilmour | ..................... | 709/206 |
| 6,205,478 B1 | 3/2001 | Sugano et al. | .............. | 709/223 |
| 6,470,338 B1 * | 10/2002 | Rizzo et al. | .................... | 707/6 |
| 6,751,596 B1 * | 6/2004 | Hastings | ....................... | 705/10 |
| 6,782,381 B2 * | 8/2004 | Nelson et al. | ................... | 707/3 |
| 6,788,768 B1 * | 9/2004 | Saylor et al. | ............. | 379/88.13 |
| 6,941,305 B2 * | 9/2005 | Magouirk et al. | ............. | 707/10 |
| 7,003,546 B1 * | 2/2006 | Cheah et al. | ................. | 709/200 |
| 2002/0194049 A1 * | 12/2002 | Boyd | ........................... | 705/9 |
| 2003/0009600 A1 * | 1/2003 | Koyama et al. | ............. | 709/310 |
| 2003/0046244 A1 * | 3/2003 | Shear et al. | .................... | 705/52 |
| 2005/0004983 A1 * | 1/2005 | Boyd | .......................... | 709/204 |

FOREIGN PATENT DOCUMENTS

WO     WO 00/11671     3/2000

OTHER PUBLICATIONS

U.S. Appl. No. 09/921,856, filed Aug. 2, 2001, Fitzpatrick et al.
U.S. Appl. No. 09/933,284, filed Aug. 20, 2001, Fitzpatrick et al.
P.K. Kannan, et al., Electronic Communities in E-Business: Their Role and Issues, *Information Systems Frontiers*, vol. 1, No. 4, pp. 415-426, (Apr. 2000).

* cited by examiner

*Primary Examiner*—John G. Weiss
*Assistant Examiner*—Michael Fisher
(74) *Attorney, Agent, or Firm*—Akerman Senterfitt

(57) ABSTRACT

A method of connecting businesses through common interests can include storing business profiles comprising business attributes in an online business registry. Responsive to a query from an inquiring business, the online business registry can be searched to locate at least one business having a business profile including at least one business attribute corresponding to the query. At least one communications link between the inquiring business and the located business can be established according to at least one business attribute of the business profile of the located business.

18 Claims, 3 Drawing Sheets

METHOD AND SYSTEM FOR CONNECTING BUSINESSES THROUGH COMMON INTERESTS

BACKGROUND OF THE INVENTION

1. Technical Field

The present invention relates to the field of business-to-business (B2B) transactions, and more particularly, to linking businesses having common interests.

2. Description of the Related Art

Electronic commerce (eCommerce) typically flows between businesses which are familiar with one another or between businesses sharing one or more common interests. ECommerce also provides businesses with an invaluable opportunity for forming new business relationships and strategic alliances. To exploit eCommerce opportunities, however, businesses must have knowledge of existing and potential market participants. Businesses choosing to share such knowledge gain an opportunity to form new synergistic business relationships. For instance, business A may benefit from forging a new relationship with the business-to-business (B2B) service provider and the financial service provider of one of its partner businesses. These newly formed relationships can benefit from the synergy existing between business A and its partner, as well as increase the overall amount of business activity among each of the participants.

Presently, the Universal Description, Discovery, and Integration (UDDI) specification provides a platform-independent, open framework for describing services, discovering businesses, and integrating business services using the Internet, as well as an operational registry. Although the UDDI specification provides a standard interface for publishing and discovering information about other businesses, the UDDI specification lacks any mechanism for linking businesses having common interests. Accordingly, no forum exists for bringing together businesses having common interests.

SUMMARY OF THE INVENTION

The invention disclosed herein provides a method and system for linking businesses through common interests. More specifically, the present invention can facilitate business relationships by storing business profiles of various participating businesses within a business registry. Participating businesses can query the business registry for other businesses whose business profiles include particular, desirable business attributes. The business profiles can include a variety of business attributes detailing information about the participating businesses. Moreover, the business attributes can include information which can be used to establish a communications link between inquiring businesses and businesses located by a search of the business registry, which can be referred to as "found" or "located" businesses. In this manner, the present invention can effectively link participating businesses through different communications systems.

One aspect of the present invention can include a method of connecting businesses through common interests. The method can include storing business profiles including business attributes in an online business registry. For example, the business attributes can include business identity information, business description information, and communication information. The storing step further can include defining access rights to the business profiles, defining permissible communications links and points of contact as business attributes within the business profiles, and defining selected business attributes of the business profiles as private.

Responsive to a query from an inquiring business, the online business registry can be searched to locate at least one business having a business profile including at least one business attribute corresponding to the query. In one embodiment of the invention, the queried business attributes can be limited to attributes which are common to the inquiring business. At least one communications link can be established between the inquiring business and the located business according to at least one business attribute of the business profile of the located business. For example, communications information for the located business can be extracted from the business profile of the located business and can be used to establish the communications link. Notably, the inquiring business can be authenticated when the communications link is established to ensure security.

Another aspect of the present invention can include storing business profiles including business attributes in an online business registry, and responsive to a query from an inquiring business specifying at least one business attribute, locating within the online business registry business profiles corresponding to the specified business attribute. For example, the specified business attribute can include a business name or identity. Within the located business profiles, references to other business profiles within the online business registry can be identified. If the other business profiles include business attributes corresponding to the query, a communications link can be established between the inquiring business and at least one of the other businesses having a business attribute corresponding to the query.

Another aspect of the invention can include a system for connecting businesses through business profiles. The system can include an online business registry configured to store business profiles including business attributes and a registration application configured to collect the business attributes of the business profiles and store the business profiles within the online business registry. The system can include a search engine configured to receive queries and search the business profiles to locate at least one other business profile corresponding to the query, as well as a communications engine configured to establish a communications link between at least two businesses having profiles included in the online business registry. Notably, the communications link established by the communications engine can be established according to at least one business parameter within at least one of the business profiles associated with the at least two businesses.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method and system for linking businesses having common interests. More specifically, the present invention can facilitate business relationships by storing business profiles of various participating businesses in a business registry. Participating businesses can query the business registry for other businesses whose business profiles include particular business attributes. If the query is successful, the invention can initiate a communications link between the querying business and one or more of the businesses corresponding to the business profiles located responsive to the query. A business located by a search of the business registry can be referred to as a "found business".

Figure 1:
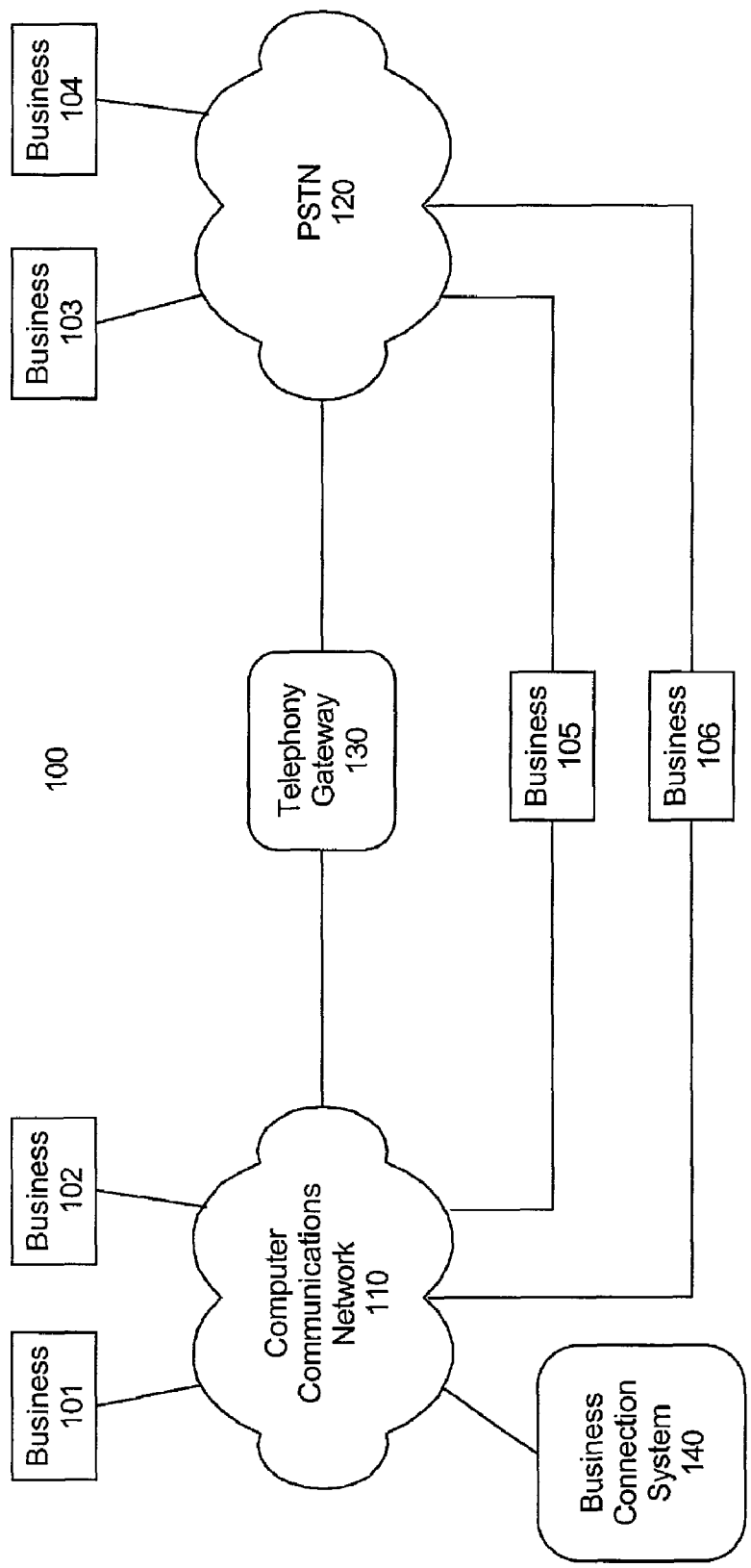
FIG. 1 is a schematic diagram illustrating a communications network in which the present invention can be used.

FIG. 1 is a schematic diagram illustrating a communications network 100 in which the present invention can be used. As shown in FIG. 1, the communications network 100 can include a plurality of participating businesses 101-106 which can be connected to a computer communications network 110, a PSTN 120, or both. The computer communications network can be the Internet, a local area network, a wide area network, or the like, and can be operatively connected to the PSTN 120 via a telephony gateway 130. The telephony gateway 130 can bridge communications between the computer communications network 110 and the PSTN 120. A business connection system (BCS) 140 also can be included in the communication system 100. As shown, the BCS 140 can be operatively connected to the computer communication system 110.

Figure 2:
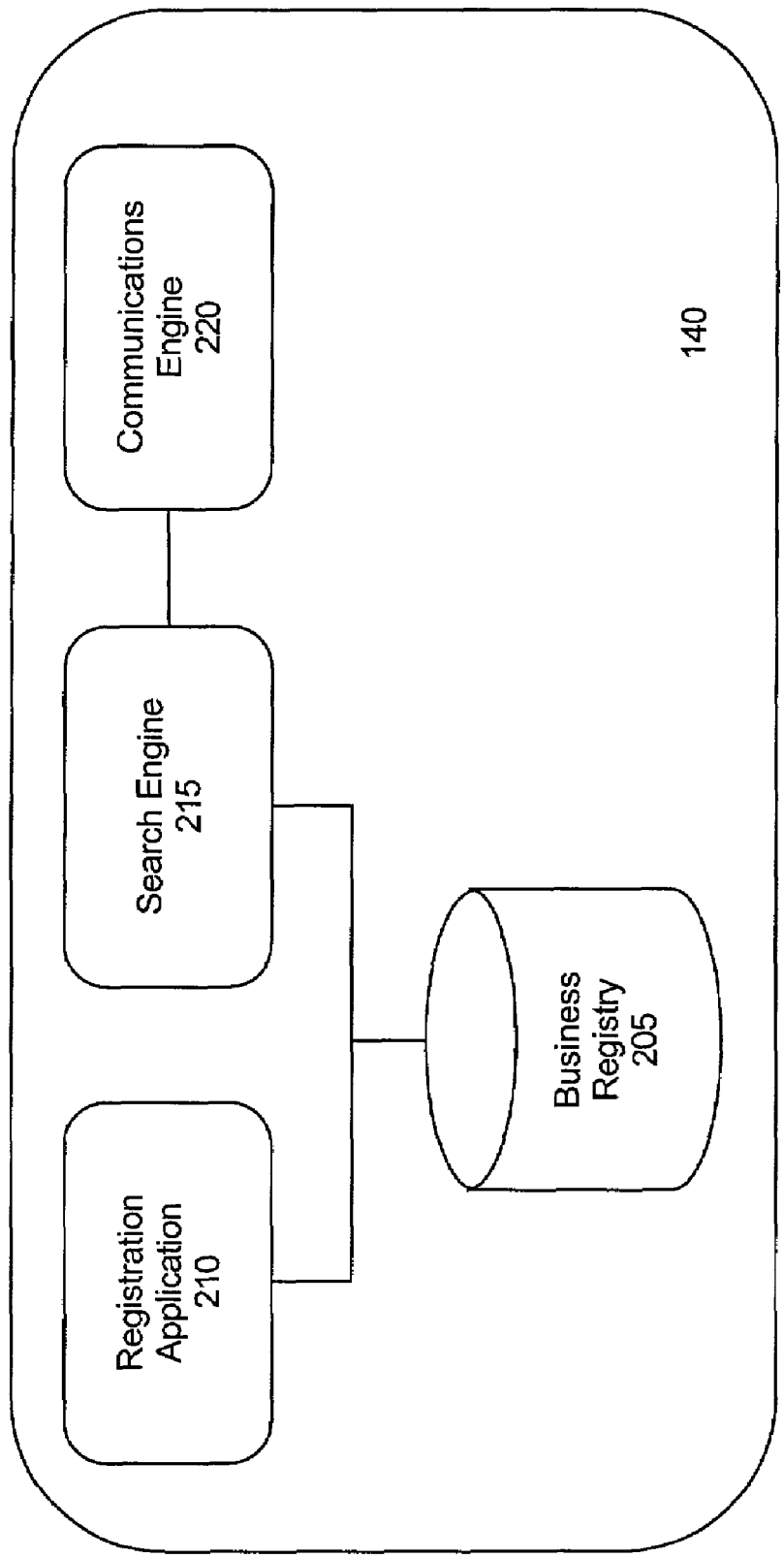
FIG. 2 is a schematic diagram illustrating a business connection system in accordance with the inventive arrangements disclosed herein.

FIG. 2 is a schematic diagram illustrating a BCS 140 in accordance with the inventive arrangements disclosed herein. The BCS can include a business registry 205, a registration application 210, a search engine 215, and a communications engine 220. The business registry 205 can include the business profiles and associated business attributes of the participating businesses. The business profiles can be stored in any suitable form including text or a markup language (ML) such as extensible markup language format (XML). For example, the business registry 205 can conform to the UDDI specification.

The business attributes can include a business identity or name, one or more business locations, business partners, related or parent businesses, personnel including board members and executives, products or services offered by the business, customer lists, as well as other service providers used by a business. The business attributes also can include communications information for establishing a communications link such as sending an electronic mail, establishing an instant message session, and establishing a telephone call, conference call, or video conference between the inquiring business and one or more found businesses. In one aspect, a business attribute can specify the format, for example which XML standard, a business uses to accept purchase orders. Additionally, the communications information can specify a Web site to which the inquiring business can be linked. The communications information can include preferred contact times and one or more contact persons which can vary depending on the mode of communication. Still, it should be appreciated that the business profiles can include any other information defined within the UDDI specification.

The business registry 205 can include security features to restrict access to particular profiles as well as particular business attributes within the business profiles. In one aspect of the present invention, business profiles can be categorized according to a particular market segment such as clothing, information technology, and the like. Business profiles further can be categorized according to the business function, such as manufacturer, service provider, retailer, etc. In this manner, business partners, for example, can be granted greater levels of access to one another's business information, while a competitor's access can be restricted.

In another aspect of the present invention, particular business attributes can be designated as private. Accordingly, private business attributes can be entirely unavailable to an inquiring business or can be accessible to an inquiring business of a particular classification or category. In another embodiment of the present invention, access to business attributes can be based on commonality of business attributes. In that case, businesses can expose selected business attributes only to inquiring businesses having corresponding or similar business attributes. For instance, in the case where business A has customers 1, 2, and 3, and business B has customers 2, 4, and 5, business A can learn that customer 2 is common to both businesses A and B. The other customers listed on the business B customer list, however, can remain private such that business A would not have access to that information.

Security further can be enhanced by authenticating participating businesses. For example, certificate authorities can be used to guarantee participating business identities in much the same manner as is common on the World Wide Web. Accordingly, access to information can be restricted in whole or in part to the business registry according to whether a business has a validly authenticated certificate or the classification or category of a participating business. Encryption also can be used to ensure data integrity.

The registration application 210 can register businesses choosing to participate in the BCS 140. Specifically, the registration application 210 can provide an interface for businesses to specify an associated business profile. For example, the registration application 210 can be used to register any information or business attributes specified in the Universal Description, Discovery, and Integration (UDDI) specification. Accordingly, the registration application 210 can be used to classify particular business attributes and entire business profiles. Additionally, the registration application 210 can function as an interface through which participating businesses can access and maintain their respective business profiles.

The search engine 215 can provide an interface through which inquiring businesses can search the business registry. Accordingly, the search engine 215 can receive queries from participating businesses and search the business registry 205 for the business attributes specified within the query. Notably, the search engine 215 can search the business registry 205 with varying levels of scrutiny. For example, if the search engine locates a reference to a business "B" within a business profile of business "A", the search engine 215 can search the business profile of business "B" for any business attributes corresponding to the query. Accordingly, although business "B" may not be in the same category as was specified within the query, the search engine still can locate businesses "B" if its business profile corresponds to the query criteria. The search type can be specified within the query or within the business profile of the inquiring business. The search engine 215 can identify any query results as well as format the results for presentation to the inquiring business. In any case, it should be appreciated that the search engine can be configured to observe the data security features of the business registry as previously described.

The communications engine 220 can extract relevant business attributes from the business profiles located by the query. In particular, the communications engine 220 can extract business attributes specifying the type of communications link to be established as well as the manner in which the communications link is to be established with one or more found businesses. Accordingly, the communications engine 220 can initiate the specified communications link. For example, the communications engine 220 can send an electronic mail, an instant message, establish a telephone call, conference call, video conference, or the like through the computer communications network and/or the PSTN. As mentioned, the business attributes further can specify an individual at the found business to be contacted as well as preferred times.

The registration application 210, the search engine 215, and the communications engine 220 can be implemented as separate application programs or a single, more complex application program. Accordingly, each of the application programs can be located within a single computer system or can be distributed among a plurality of computer systems operatively connected to a computer communications network. For example, one or more of the application programs can be implemented as an Internet service or within a virtual private network (VPN) of a participating business. Similarly, the business registry 205 can be a single data store located within a single computer system or can be distributed among a plurality of computer systems. In one embodiment of the present invention, the business registry can be distributed among the participants. In that case, searches can be directed to the participants rather than to a single centralized online business registry 205.

Figure 3:
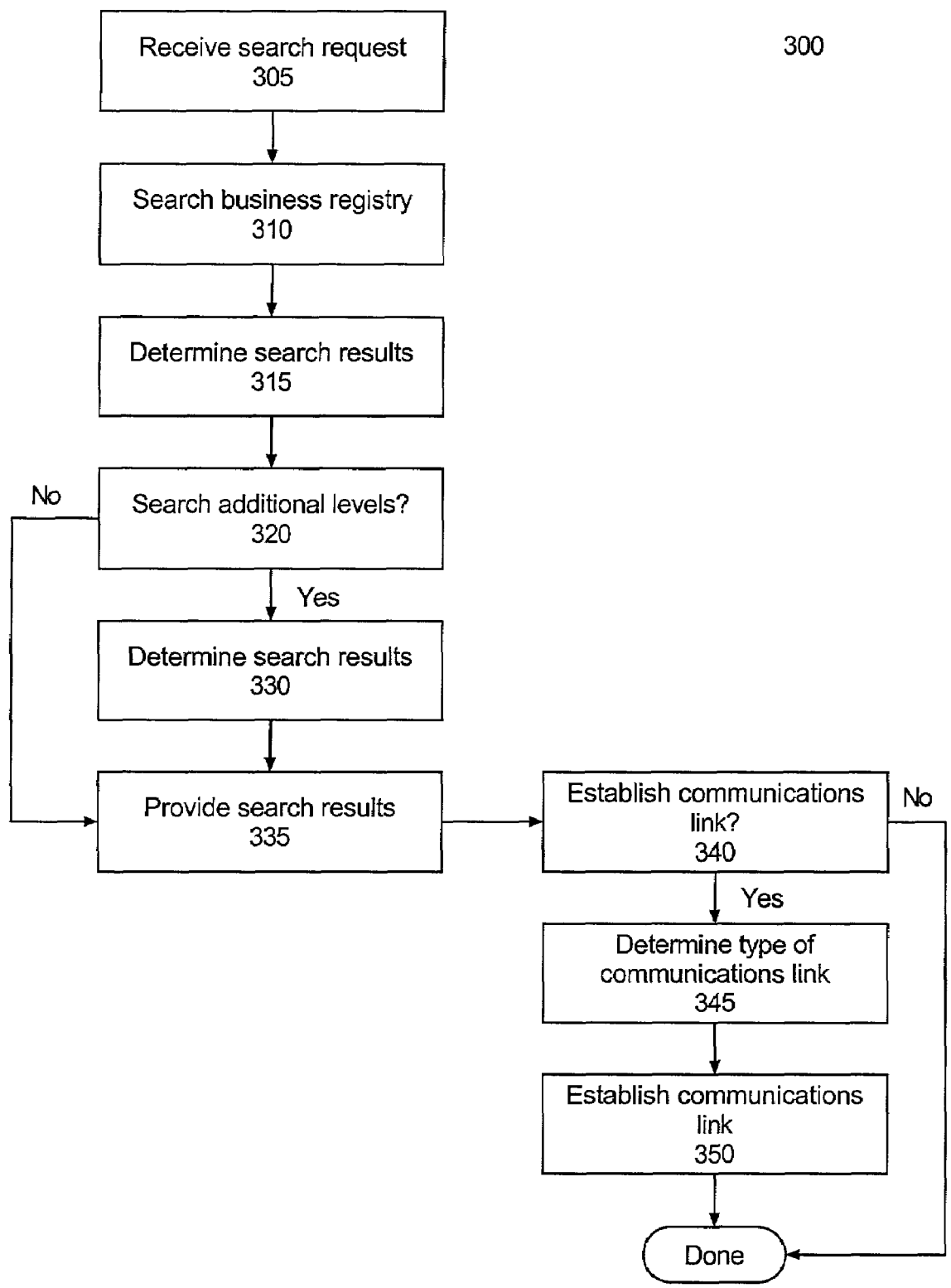
FIG. 3 is a flow chart illustrating a method of linking businesses using common interests in accordance with the inventive arrangements disclosed herein.

FIG. 3 is a flow chart illustrating a method 300 of linking businesses using common interests in accordance with the inventive arrangements disclosed herein. The method can begin in a state wherein multiple businesses have registered with the BCS 140 of FIG. 2 and an inquiring business has logged onto the BCS 140. The inquiring business further can be authenticated at some point prior to issuing a query or anytime before obtaining any search results. Accordingly, in step 305 a search request can be received from an inquiring business. Notably, the search request can conform to a standard set of published application programming interfaces. The search request can be a passive or automatic search, or can be an explicit search. After completion of step 305, the method can continue to step 310.

In step 310, the business registry can be searched for the business attributes specified within the search request. The search can be implemented using matching algorithms which can search for exact matches, fuzzy logic, or other language translation techniques which are known in the art. In any case, it should be appreciated that any of a variety of search techniques can be used and the invention is not so limited by the particular search used. Also, as mentioned, particular business attributes within the business profiles can be excluded from the query based upon the level of access of the inquiring business.

In step 315, the search results can be determined. In step 320, if the query was directed to searching business profiles referenced within the initial search results, the method can continue to step 330 to search those business profiles and determine the search results from the additional searching. Still, it should be appreciated that the searching can continue to any specified level of depth, for example to businesses referenced within the secondary search results, etc. If the search is not directed to searching business referenced within the initial search results, the method can continue to step 335. In step 335, the search results can be processed and provided to the inquiring business. For example, the search results can be formatted using an appropriate markup language and sent or displayed to the inquiring business. After completion of step 335, the method can continue to step 340.

In step 340, the inquiring business can be provided the opportunity to establish a communications link with one or more of the found businesses. If the inquiring business chooses not to establish a communications link with a found business, then the method can end. If, however, the inquiring business chooses to establish a communications connection with one or more found businesses, the method can continue to step 345. In step 345, a communications link type, such as electronic mail, linking to a Web site, instant messaging, or a telephone call, can be determined from the business profile of the found and selected business. In step 350, a communications link can be established between the inquiring business and the found business according to the business attributes within the business profile of the found business. As mentioned, the business attributes can specify a contact person to which such communications can be directed. Accordingly, the communications link can be directed to that person.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of connecting businesses through common interests and for facilitating business relationships among businesses comprising:

identifying a plurality of businesses to participate in an online business registry;

storing business profiles comprising business attributes in an online business registry, wherein each business profile is associated with one of the identified businesses and includes for each identified business one or more market segments associated with the identified business, a corresponding customer list for each of said market segments, one or more business functions associated with each of said market segments, wherein the business attributes corresponding to each of the market segments associated with a stored business profile are classified into one of a plurality of access levels;

responsive to a query from an inquiring business, searching said online business registry to locate at least one business having a business profile including at least one business attributes corresponding to said query;

for each of the market segments associated with the inquiring business, determining whether the inquiring business and at least one located business are competitors in said market segment based upon a comparison of customer lists associated with the market segment and associated business functions;

establishing at least one communications link between said inquiring business and said located business according to at least one business attribute of said business profile of said located business; and providing access to the inquiring business to at least a portion of the business attributes of the located business, wherein access to the business attributes of said located business corresponding to one of said market segments is restricted to less than all of the plurality of access levels if the located business and the inquiring business are determined to be competitors in said one of said market segments.

2. The method of claim 1, wherein said online business registry conforms to a Universal Description Discovery and Integration (UDDI) specification, and wherein said searching step comprises searching said online business registry according to said query, wherein said specified business attribute is common to said inquiring business.

3. The method of claim 1, wherein said storing step comprises storing business attributes selected from the group consisting of business identity information, business description information, and communications information.

4. The method of claim 1, wherein said establishing a communications link step comprises extracting said communications information from said business profile of said located business.

5. The method according to claim 3, wherein said storing step further comprises:
defining access rights to said business profiles;
defining permissible communications links and points of contact as business attributes within said business profiles; and
defining selected business attributes of said business profiles as private.

6. The method of claim 1, wherein said establishing a communications link step further comprises authenticating at least said inquiring business.

7. A method of connecting businesses through common interests comprising:
storing business profiles for a plurality of businesses, said business profiles comprising business attributes in an online business registry, wherein each business profile is associated with one of said plurality of businesses, wherein each business profile identifies a corresponding business by one or more market segments occupied by said business, list of customers for each of said market segments, and business function performed by the corresponding business in said market segments, and wherein the business attributes corresponding to said market segments for each stored business profile are classified into one of a plurality of access levels;
responsive to a query from an inquiring business specifying at least one business attribute, locating within said online business registry business profiles corresponding to said specified business attribute;
for each of said market segments associated with the inquiring business, determining whether the inquiring business and at least one located business are competitors in said market segment based upon a comparison of business functions in said market segment corresponding to the inquiring business and at least one located business;
permitting access to the inquiring business to at least a portion of the business attributes of the located business, wherein access to the business attributes of said located business corresponding to one of said market segments is restricted to less than all of the plurality of access levels if the located business and the inquiring business are determined to be competitors in said one of said market segments;

identifying within said located business profiles references to other business profiles contained within said online business registry; and determining whether said other business profiles include business attributes corresponding to said query, wherein said plurality of businesses comprise businesses associated with said located business profiles, businesses associated with said other business profiles, and said inquiring business.

8. The method of claim 7, further comprising:
establishing a communications link between said inquiring business and at least one of said other businesses having a business attribute corresponding to said query, wherein the communication link is established according to business attributes of said at least one other business.

9. The method of claim 7, wherein said locating step locates within said online business registry business profiles corresponding to said specified business attribute, wherein said specified business attribute is a business identity.

10. The method of claim 7, wherein said locating step comprises locating in said online business registry, business profiles associated with said specified business attribute of said query, wherein said specified business attribute is common to said inquiring business.

11. The method of claim 7, wherein said storing step comprises storing business attributes selected from the group consisting of business identity information, business description information, and communications information.

12. The method of claim 11, wherein said establishing a communications link step comprises extracting said communications information from said business profile of at least one of said other businesses, and wherein said online business registry conforms to a Universal Description Discovery and Integration (UDDI) specification.

13. The method according to claim 11, wherein said storing step further comprises:
defining access rights to said business profiles;
defining permissible communications links and points of contact as business attributes within said business profiles; and
defining selected business attributes of said business profiles as private.

14. The method of claim 11, wherein said establishing a communications link step further comprises authenticating at least said inquiring business.

15. A method of connecting businesses through common interests comprising:
storing business profiles for a plurality of businesses in an online business registry, said business profiles comprising a plurality of business attributes associated with each of said businesses;
responsive to a query from an inquiring business, searching said online business registry to locate at least one of said plurality of businesses having a business profile including at least one business attribute corresponding to said query, said business attributes for each of said businesses including one or more market segments associated with each of said businesses, a customer list corresponding to said market segments, at least one business function corresponding to said market segments;

for each of the market segments associated with the inquiring business, determining whether the inquiring business and at least one located business are competitors based upon a comparison of customer lists and associated business functions;

providing access to the inquiring business to at least a portion of the business attributes of the located business, wherein access to portions of the business attributes of said located business corresponding to one of said market segments is restricted if the located business and the inquiring business are determined to be competitors in said one of said market segments; and establishing at least one communications link between said inquiring business and said located business according to at least one business attribute of said business profile of said located business and providing over said communications link an indication as to whether the inquiring business is a competitor of the located business with which said communications link is established;

wherein said at least one communications link is established by establishing at least one of a telephone call, a conference call, and a video conference.

16. The method of claim 15, wherein the business attributes include communication information, and wherein the at least one communications link is established based upon the communication information.

17. The method of claim 16, wherein the communication information comprises at least one of a preferred contact time and a pre-selected contact person.

18. The method of claim 17, wherein the at least one communications link comprises a plurality of communications link, and wherein establishing at least one communications link further comprises selecting one of the plurality of communications links based on at least one of the preferred contact time and pre-selected contact person.

* * * * *